United States Patent
McDonald (10) Patent No.: US 8,807,991 B2
(45) Date of Patent: Aug. 19, 2014

(54) OXY-FUEL COMBUSTION OXIDANT HEATER INTERNAL ARRANGEMENT

(75) Inventor: Dennis K. McDonald, Massillon, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 487 days.

(21) Appl. No.: 12/712,268

(22) Filed: Apr. 12, 2010

(65) Prior Publication Data

US 2011/0250551 A1    Oct. 13, 2011

Related U.S. Application Data

(63) Continuation-in-part of application No. 12/169,168, filed on Jul. 8, 2008, now Pat. No. 8,327,809.

(60) Provisional application No. 60/948,784, filed on Jul. 10, 2007.

(51) Int. Cl.
F23L 7/00    (2006.01)

(52) U.S. Cl.
USPC ............... 431/215; 431/216; 431/11; 431/36; 431/211; 110/302

(58) Field of Classification Search
USPC ............. 431/11, 215, 216, 36, 161–167, 207, 431/210, 211; 110/302, 304; 122/1 A; 165/8, 9, 10; 432/179–181; 60/645, 60/653, 670
See application file for complete search history.

(56) References Cited

U.S. PATENT DOCUMENTS

| | | | |
|---|---|---|---|
| 5,038,849 | A | 8/1991 | Hagar |
| 5,915,340 | A | 6/1999 | Cronin et al. |
| 6,202,574 | B1 | 3/2001 | Liljedahl et al. |
| 6,581,676 | B2 | 6/2003 | Fierle et al. |
| 6,640,752 | B1 | 11/2003 | Counterman |
| 6,647,929 | B1 | 11/2003 | Counterman |
| 6,974,318 | B2 | 12/2005 | Ahn et al. |
| 7,082,987 | B2 | 8/2006 | Hamilton |
| 7,278,378 | B2 | 10/2007 | Counterman |
| 2006/0090468 | A1 | 5/2006 | Counterman |
| 2009/0013941 | A1* | 1/2009 | Alexander et al. ............ 122/1 A |

OTHER PUBLICATIONS

Office Action dated Nov. 20, 2010 from related Chinese Patent Application No. 200810171491.0.
Office Action dated Jul. 20, 2011 from related Chinese Patent Application No. 200810171191.0.
Office Action dated Dec. 31, 2011 from related Chinese Patent Application No. 200810171191.0.
Office Action dated Jul. 30, 2013 from corresponding Canadian Patent Application No. 2,730,611.
Examination Report dated Nov. 20, 2013 from corresponding New Zealand Patent Patent Application No. 602037.

* cited by examiner

*Primary Examiner* — Alfred Basichas
(74) *Attorney, Agent, or Firm* — Eric Marich; Michael J. Seymour; Christopher L. Smith (57) ABSTRACT

A regenerative oxidant heater internal arrangement, including a system and method for use thereof, utilizing a unique recycle oxy-combustion methodology which includes at least two primary combustion oxidant sectors placed adjacent to both the flue gas side as well as a secondary oxidant sector positioned between the two primary sectors.

12 Claims, 7 Drawing Sheets

CASE 1: Primary adjacent to gas side, oxygen added after airheater - NO OXYGEN LOST TO CPU
SPSOH - Separate Primary and Secondary Oxidant heaters

| Oxygen | | O2 | 0.95 | | Assumed Airheater Leakages | |
|---|---|---|---|---|---|---|
| | | Ar | 0.05 | | Primary to gas | 20.0% |
| | | | | | Primary to Secondary | 15.0% |

| | | AH INLET | | AH OUTLET | | CPU INLET | |
|---|---|---|---|---|---|---|---|
| Leaving Boiler | mass flow (lb/h) | 1427400 | | 1498292 | | 331873.92 | |
| FG-01 | Temp F | 700 | | 633 | | | |
| | CO2 | 74.0200% | | 74.573% | | 85.700% | |
| | H2O | 16.0500% | | 15.436% | | 3.080% | |
| | SO2 | 0.4400% | | 0.419% | | 0.000% | |
| 2% conversion | SO3 | 0.0088% | | 0.008% | | 0.000% | |
| | O2 | 2.5100% | | 2.540% | | 3.140% | |
| | N2 | 4.2800% | | 4.312% | | 4.960% | |
| | Ar | 2.7100% | | 2.729% | | 3.120% | |
| | TOTAL | 100.019% | | 100.018% | | 100.000% | |

| | | | | With O2 | | | Reduction |
|---|---|---|---|---|---|---|---|
| | | | | | | 347200 (SPSOH) | 15326.08 |

| Secondary w/o O2 | mass flow (lb/h) | 711431 | | 881931 | | 935100 (SPSOH) | |
| SA-06 | Temp F | 394 | | 366.16 | | | |
| | CO2 | 73.1800% | | 59.032% | | | |
| | H2O | 15.8700% | | 12.802% | | | |
| | SO2 | 0.4300% | | 0.347% | | | |
| assume 95% capture | SO3 | 0.0004% | | 0.000% | | | |
| | O2 | 3.5400% | | 21.222% | | | |
| | N2 | 4.2500% | | 3.428% | | | |
| | Ar | 2.7200% | | 3.161% | | | |
| | TOTAL | 99.9904% | | 99.992% | | | |

| Secondary Oxygen | mass flow (lb/h) | 170500 | | | | | |
| OX-01 | Temp F | 250 | | | | | |

| Primary w/o O2 | mass flow (lb/h) | 354462 | | 230400.3 | | 230400 (SPSOH) | |
| PA-03 | Temp F | 130 | | 643 | | | |
| | CO2 | 85.7000% | | 85.700% | | | |
| | H2O | 3.0800% | | 3.080% | | | |
| | SO2 | 0.0000% | | 0.000% | | | |
| assume 99% capture | SO3 | 0.0000% | | 0.000% | | | |
| | O2 | 3.1400% | | 3.140% | | | |
| | N2 | 4.9600% | | 4.960% | | | |
| | Ar | 3.1200% | | 3.120% | | | |
| | TOTAL | 100.000% | | 100.000% | | | |

| Primary Oxygen | mass flow (lb/h) | 33400 | | | | | |
| OX-02 | Temp F | 250 | | | | | |

Airheater Diagram

SUMMARY (Approx.)
1. O2 savings 1.19 Tonnes/hr (CPU-01 flow x [O2% FG-02 - O2% PA-02]
2. Total Fan Power is   50.21 kW lower
3. Removes   15329 lb/h more water from the process than SPSOH
4. Removes   520 lb/h more SO2 from the process than SPSOH
5. Cooler primary leakage the airheater balance

Figure 11

Fan Power Comparison

Separate Primary and Secondary Heaters (SPSOH)

|  | ACFM | DP ("wg) | HP | kW |
|---|---|---|---|---|
| Primary | 40861 | 40.0 | 322.80 | 253.48 |
| FD | 224580.0 | 25 | 1108.86 | 870.75 |
| ID | 144230.8 | 40.0 | 1139.42 | 894.75 |
|  |  | TOTAL |  | 2018.98 |

Fan η    0.8
Motor η  0.95

CASE 1 Design

|  | ACFM | DP ("wg) | HP | kW | Power Savings (+) |
|---|---|---|---|---|---|
|  | 57571.0 | 40 | 454.81 | 357.15 |  |
|  | 180896.2 | 25 | 893.17 | 701.38 |  |
|  | 146730.0 | 40.0 | 1159.17 | 910.25 |  |
|  |  | TOTAL |  | 1968.78 | 50.21 |

OXY-FUEL COMBUSTION OXIDANT HEATER INTERNAL ARRANGEMENT

This patent application claims priority to and is a continuation-in-part of U.S. patent application Ser. No. 12/169,168, filed Jul. 8, 2008, now U.S. Pat. No. 8,327,809, issued on Dec. 11, 2012, and titled "Tri-Sector Regenerative Oxidant Preheater for Oxy-Fired Pulverized Coal Combustion," which itself claims priority to and is a non-provisional of U.S. Provisional Patent Application No. 60/948,784 filed Jul. 10, 2007 and titled "Method of Reducing Airheater Leakage for Oxycombustion Power Plant."

FIELD AND BACKGROUND OF THE INVENTION

The present invention relates generally to the field of oxidant heaters (air heaters and air pre-heaters) for use in coal-fire power plants and in particular to a system and method for use in oxy-fuel combustion which incorporates a novel regenerative oxidant heater internal sector arrangement as well as the strategic positioning of the primary oxidant fan and primary oxidant mixer.

Oxygen combustion ("oxy-fuel combustion") is a means of drastically decreasing the amount of nitrogen in the flue gas from a boiler firing a carbonaceous fuel in order to achieve a much higher concentration of carbon dioxide ($CO_2$) in the combustion gasses to permit compression and storage. An oxidant, such as pure oxygen, and a carbonaceous fuel, such as coal, is introduced into the boiler furnace where the fuel is ignited and burned. The resulting gaseous combustion product will contain primarily $CO_2$ along with some water and various compounds and oxides depending on the fuel composition. This gas is then further purified and compressed as needed to suit pipeline and storage requirements.

The oxy-fuel combustion process offers several configurations, each having its advantages and disadvantages. In one configuration, the hot flue gas flowing from the oxidant heater outlet is split into primary and secondary streams. Oxygen is then mixed with these streams and they are recycled back to the boiler as primary and secondary oxidant to provide dilution of the flame temperature and maintain gaseous volume for convective heat transfer.

Oxidant may be introduced into the boiler system in several locations and the mixture of oxidant and flue gas is generally heated before it enters the combustion process. Prior to entering the combustion process the recycled gas streams undergo various flue gas treatment processes, which may include removal of particulate matter, $SO_2$ scrubbing, and moisture reduction processes.

In one process variation, warm recycle, the flue gas leaving the oxidant heater is immediately split into two streams. One stream passes through particulate, $SO_2$, and moisture removal as described herein, before being further split between the primary and exit stream to a CPU. The other, secondary stream, passes through particulate removal, and is routed back to the oxidant heater in a "warm" state (about 400 F).

In conventional combustion systems, the most widely used and lowest cost type of oxidant heaters which are employed to heat the combustion oxidant (i.e., air) are regenerative oxidant heaters ("air heaters" or "air pre-heaters").

Regenerative oxidant heaters transfer heat indirectly by convection as a heat storage medium is periodically rotated into the hotter and cooler flow streams. In steam generating plants, tightly packed bundles of corrugated steel plates serve as the storage medium. In these units either the steel plates, or surface elements, rotate through oxidant (or air) and gas streams, or rotating ducts direct oxidant and gas streams through stationary surface elements.

Figure 1:
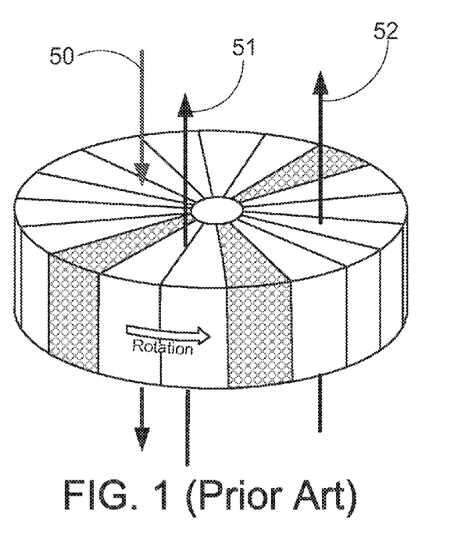
FIG. 1 is a perspective view of the rotor in a conventional prior art Ljungstrom® type regenerate oxidant heater ("air heater" or "air pre-heater") which shows the typical positioning of the sectors through which the primary and secondary oxidant streams, as well as the flue gas stream flow.

The conventional regenerative oxidant heater which is most commonly used is the Ljungstrom® type which features a cylindrical shell plus a rotor which is packed with bundles of heating surface elements which are rotated through counterflowing oxidant and gas streams. FIG. 1 shows the typical positioning of the sectors through which the primary oxidant stream 51 and secondary oxidant stream 52 as well as the counterflowing flue gas stream 50 flows in a conventional Ljungstrom® type regenerative oxidant heater. As is shown, oxidant flows through one half of the rotor and flue gas which comes from the boiler's gas exit flows through the other half. Additionally, the oxidant side (or "air side") consists of two sectors, one for the primary stream and one for the secondary stream.

Figure 2:
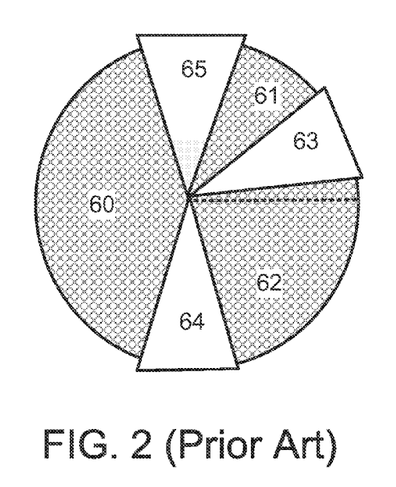
FIG. 2 is a cross sectional view of another conventional prior art regenerative oxidant heater sector arrangement as laid out in U.S. patent application 2006/0090468 filed by Counterman which shows the positioning of the primary, secondary and flue gas sectors.

Another common conventional regenerative oxidant heater sector arrangement includes that which is disclosed in U.S. patent application 2006/0090468 filed by Counterman ("Counterman"). The regenerative oxidant heater of Counterman is adapted to receive a flow of cool oxidant in counterflow to the flow of hot flue gas and to provide a heat exchange between the cool oxidant and the hot flue gas to convert the cool oxidant into the heated combustion oxidant. FIG. 2 (Prior Art) is a bottom cross sectional view of the rotor of an oxidant heater with a typical sector arrangement, which is also employed in Counterman. It shows the primary oxidant sector 61, and the secondary oxidant sector 62, through which respective primary and secondary oxidant streams flow toward a boiler. The primary and secondary sectors 61, 62 are separated by a sector plate 63 and they are both adjacent to the flue gas sector 60, through which flue gas flows away from a boiler. Additionally, the primary and secondary sectors 61, 62 are separated from the flue gas sector 60 by sector plates 64 and 65.

In conventional regenerative oxidant heaters for an air-fired power plant, a typical pressure for the primary oxidant stream (or "air stream") is high as compared with that of both the secondary air stream and the flue gas stream. For example, a typical pressure for the primary oxidant stream is about +40 inches of water gage (in. wg), for the secondary oxidant stream it is about +20 in. wg, and for the flue gas stream from the boiler it is about −5 in. wg. Thus, between the secondary air sector and gas side there is about a +25 inches water gauge difference in air pressure which can result in 14% leakage of the oxidant into the gas side. Furthermore, the pressure gradient between the primary air sector and the gas side is much greater.

In all regenerative heaters which use conventional sector arrangements such as those discussed above, the rotating heat exchanger in combination with the pressure differential between the respective streams causes inherent leakage between the air (or oxidant) side and the gas side conveying the hot flue gas from the boiler.

Figure 3:
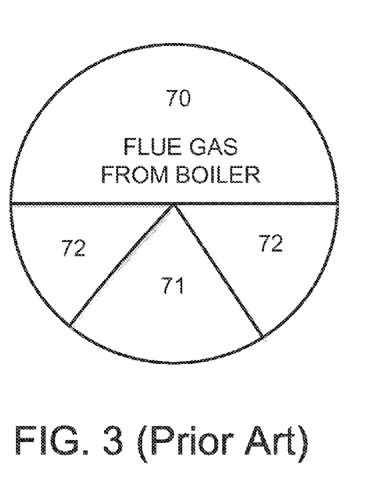
FIG. 3 is a cross sectional view of a further conventional prior art regenerative oxidant heater sector arrangement having two secondary sectors adjacent to the flue gas side.

Thus, a further known oxidant heater sector arrangement as shown in FIG. 3 splits the secondary oxidant stream 72 in two and positions it in two secondary air sectors adjacent to the gas side 70. Here, the primary sector 71 through which the primary oxidant stream flows is positioned between the two secondary sectors in order to minimize the pressure difference to the greatest extent possible in an attempt to reduce leakage and optimize performance.

However, in oxy-fuel combustion, all these configurations result in leakage from the oxidant to the gas side. In addition most of the oxygen must be added to the recycled flue gas upstream of the oxygen heater in order to achieve a reasonable flue gas temperature leaving the oxidant heater. Thus any leakage results in the loss of costly oxygen along with recycle gas to the exit stream thereby necessitating additional oxygen production in an air separation unit (ASU) to make up for the loss as well as removal of additional oxygen from the product gas in a compression and purification unit (CPU) before the concentrated $CO_2$ can be disposed of. A need exists to minimize such leakage as the cost of additional oxygen production and removal is prohibitive.

An additional problem encountered when using an oxidant heater employing a conventional sector arrangement in oxy-fuel combustion, is difficulty achieving acceptable exit gas temperature. Due to the high temperatures of the flue gas and oxidant streams, it can be very difficult, especially evident in warm recycle, to achieve an acceptable gas temperature at the oxidant heater exit.

Furthermore, the concern about costly oxygen loss as well as the problem caused by the high temperature of the oxidant(s) and flue gas makes it difficult to achieve a design that balances both acceptable heat exchanges within the oxidant heater as well as reasonable oxidant heater exit gas temperatures.

When attempting to achieve such a balance, a typical known step is to add cool oxidant to the oxidant flow stream(s) prior to (i.e., upstream from) the oxidant heater. However, this conventional method is undesirable because leakage from the oxygenated oxidant stream(s) into the boiler flue gas stream results in the loss of costly oxygen. The loss of oxygen occurs because a substantial portion of it will flow in the stream which leads to the compression process. Additionally, if the oxygen is added to the primary or secondary oxidant stream after the oxidant heater an acceptable oxidant heater design becomes more difficult to achieve.

Another common approach which has been taken in an attempt to reduce leakage and hence loss of costly oxygen, is to locate the primary oxidant fan downstream of the oxidant heater. However, this approach has consistently been ineffective.

Additionally, a known alternative to using a regenerative oxidant heater in order to eliminate internal leakage and avoid loss of costly oxygen, is to use expensive separate primary and secondary tubular or plate type pre-heaters for the secondary and primary oxidant streams which completely separates the oxidant side and the gas side allowing no leakage. However, although this alternative may be reasonable for use on the industrial boiler scale in air fired applications, it is not cost effective when applied to large utility boilers. Additionally, separate tubular pre-heaters require considerably more space than regenerative oxidant heaters and tubular pre-heaters are susceptible to significant internal leakage with age, thus inevitably resulting in oxidant loss.

Accordingly there is a clear need for a cost effective system and method which incorporates a regenerative oxidant heater design that will minimizes the loss of costly oxygen normally caused by internal oxidant heater leakage and which will also achieve an acceptable balance between reasonable heat exchange within the oxidant heater and a reasonable oxidant heater exit flue gas temperature.

SUMMARY OF THE INVENTION

Accordingly it is an object of the present invention to provide a cost effective system and method for use in oxy-fuel combustion which allows a regenerative oxidant heater design; which minimizes the loss of costly oxygen typically caused by internal leakage between the air and gas sides of a regenerative oxidant heater (or "air heater" or "air pre-heater"); and which simultaneously aids in achieving a balance between acceptable heat exchange within the oxidant heater and reasonable oxidant heater exit gas temperatures. Another object of the present invention is to significantly reduce overall power plant operating cost as compared with those plants which use separate air heaters and/or tubular air heater designs. It is yet another object of the present invention to improve the gas composition to the boiler by reducing the total amount of sulfur and moisture in the recycle combustion oxidant which is returned to the boiler via primary and secondary oxidant recycle streams.

To achieve its objectives and eliminate the problems of the prior art, the system and method of the present invention employs an unconventional and novel regenerative oxidant heater internal sector arrangement which utilizes leakage from a primary combustion oxidant stream (or "recycle gas stream") having a low oxygen content, into both a flue gas stream which flows out from a boiler's gas exit, as well as into an oxygenated secondary combustion oxidant stream which flows toward the boiler.

A preferred oxidant heater internal sector arrangement according to the present invention comprises a flue gas side consisting of a sector, through which a flue gas stream flows away from a boiler's gas exit; and a counterflowing combustion oxidant side which comprises at least one secondary combustion oxidant sector through which an oxygenated secondary combustion oxidant stream flows toward the boiler as well as at least two primary combustion oxidant sectors through which a cold primary combustion oxidant stream, which has a relatively low oxygen content (i.e., roughly equivalent to the oxygen concentration of the flue gas stream), flows toward the boiler.

In addition to an oxidant heater with the aforementioned sector arrangement, a preferred system of the present invention comprises a primary oxidant fan, which feeds primary oxidant flow to the oxidant heater positioned upstream of the oxidant heater as well as a primary oxidant mixer, positioned downstream of the oxidant heater, which introduces an oxidant (i.e., oxygen or air) into the primary combustion oxidant stream.

Furthermore, a preferred method according to the present invention comprises the first step of providing an oxidant heater having the aforementioned internal sector arrangement. Before it enters the oxidant heater on its way to the boiler, the cold primary oxidant stream, which has a static gas pressure greater than the pressure of both the secondary combustion oxidant and flue gas streams, is split up and then directed to flow through the at least two separate primary combustion oxidant sectors.

Additionally, the preferred method comprises the further step of allowing the cold primary combustion oxidant to leak into both a flue gas sector and into at least one secondary combustion oxidant sector as it flows through the oxidant heater. In this embodiment flow to the primary oxidant fan is increased to provide additional primary oxidant flow to the oxidant heater for the purpose of making up the portion of flow lost as a result of the leakage into the flue gas and secondary combustion oxidant streams. This embodiment provides an additional unexpected benefit especially beneficial in warm recycle embodiments. By increasing oxidant flow (via primary fan), the demand on the secondary fan is reduced, thereby enabling an overall power saving by virtue of the increased volumetric flow of the cooler denser gas to the primary fan, and a decrease of volumetric flow of the warmer lighter/less dense gas operatively conveyed by the secondary fan. A final step of a preferred method is introducing oxidant into the primary stream at a location downstream from the oxidant heater.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The present invention relates to a system and method designed for use in oxy-fuel combustion where a regenerative oxidant heater is desired, and it incorporates a novel regenerative oxidant heater internal sector arrangement as well as the strategic positioning of both a primary oxidant fan and primary oxidant mixer.

The system and method of the present invention, among other things, minimizes loss of oxygen to the boiler flue gas stream and simultaneously provides a sufficient amount of cool oxidant flow to the oxidant heater so that a reasonable heat exchange within the oxidant heater and a reasonable oxidant heater exit gas temperature can be achieved. Furthermore, the system and method of the present invention accomplish this, in part, by employing and oxidant heater internal sector arrangement which can allow a substantial amount of internal leakage from a cold primary combustion oxidant stream to both a flue gas stream and a secondary combustion oxidant stream.

Figure 4:
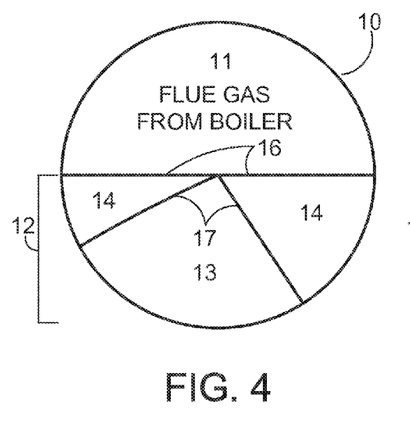
FIG. 4 is a cross sectional view showing a regenerative oxidant heater internal sector arrangement according to the present invention.

Referring now to the drawings, in which like reference numerals are used to refer to the same or similar elements, FIG. 4 shows a cross sectional view of a regenerative oxidant heater 10 having an internal sector arrangement according to the present invention. It consists of a flue gas side 11 and a combustion oxidant side 12 which are separated by sector plates 16. The flue gas side consists of a single sector through which a flue gas stream 20 (shown in FIGS. 8A, 8B, and 9) flows away from a boiler 1 as it leaves the boiler's gas exit 2 (shown in FIGS. 8A, 8B, and 9). The combustion oxidant side 12 comprises two primary combustion oxidant sectors 14 and one secondary combustion oxidant sector 13, each of which is separated from the others by sector plates 17. The primary and secondary sectors 14, 13 contain primary and secondary combustion oxidant streams 25, 22 (shown in FIGS. 8A, 8B, and 9) which flow through them, in a counterflow manner to the flue gas stream 20, on their way toward the boiler.

As further illustrated in FIG. 4, each of the two primary sectors 14 are adjacent to, i.e., they abut, the flue gas side 11 of the oxidant heater 10. Additionally, the secondary combustion oxidant sector 13 is positioned between the two primary sectors 14.

In order for the present invention to accomplish its objectives, it is essential that there be at least two primary combustion oxidant sectors 14 each positioned adjacent to the flue gas side 11 of the oxidant heater 10. However, as illustrated by another embodiment of the oxidant heater internal sector arrangement shown in FIG. 7, there can be more than two primary combustion oxidant sectors 14.

Figure 6:
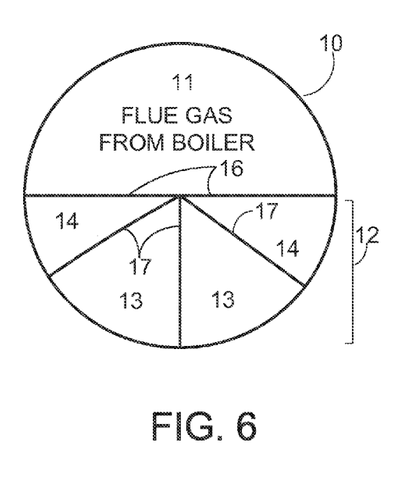
FIG. 6 is a cross sectional view showing another embodiment of a regenerative oxidant heater internal sector arrangement according to the present invention.
Figure 7:
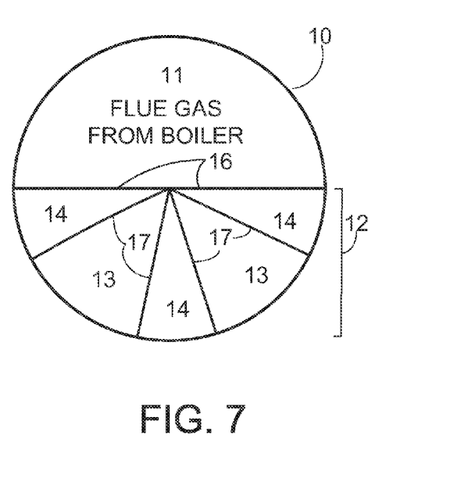
FIG. 7 is a cross sectional view showing yet another embodiment of a regenerative oxidant heater internal sector arrangement according to the present invention.

Similarly, there can be more than one secondary combustion oxidant sector 13 as shown in both FIG. 7 and in FIG. 6 which illustrates an additional embodiment of the oxidant heater internal sector arrangement. However, although there may be more than one, it is essential that all secondary sectors 13 be positioned between the two primary sectors 14 which abut the flue gas side 11, and that none of the secondary sectors 13 be positioned adjacent to the flue gas side 11 of the oxidant heater 10.

In order to describe the benefits afforded by the present invention and how it functions, a discussion of the oxygen concentrations and static gas pressures of the primary oxidant stream 25, the secondary oxidant stream 22 and the flue gas stream 20 is required.

Figure 5:
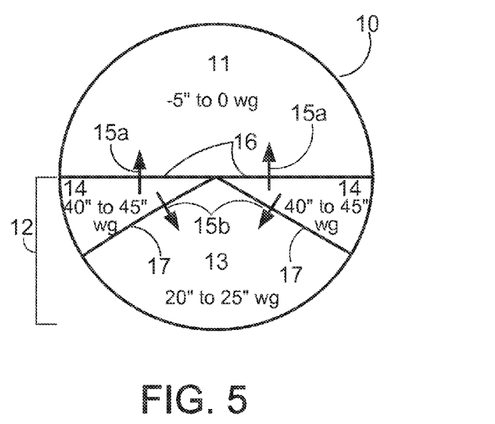
FIG. 5 is a cross sectional view of a regenerative oxidant heater internal sector arrangement according to the present invention which shows the typical static gas pressure of the respective oxidant and flue gas streams as well as the direction of leakage.

As illustrated in FIG. 5, in a regenerative oxidant heater for an oxy-combustion power plant, a typical static gas pressure for the primary oxidant stream 14 is from about +40 to +45 inches of water gage (in. wg), for the secondary oxidant stream 13 it is from about +20 to +25 in. wg, and for the flue gas stream 11 from the boiler 1 it is from about −5 to 0 in. wg. These static gas pressure values shown in FIG. 5 are representative of a coal fired oxy-combustion plant, yet may vary depending on fuel and equipment variations and should not be considered absolute.

Since it is the pressure differential between the respective sectors which drives leakage and since typically the greater the degree of leakage the more oxygen is lost, it is not intuitively obvious that the best internal configuration would locate the higher pressure primary combustion oxidant stream 25 adjacent to the flue gas stream 20 from the boiler 1 to avoid loss of oxygen, since the leakage would be considerably higher than with a conventional internal arrangement. However, when taking into consideration the typical oxygen concentrations of the respective streams the reason for doing so becomes clear.

In an oxy-fuel combustion system, the secondary oxidant stream 22 typically has an oxygen concentration of about 20.0% which is generally greater than that of both the primary oxidant stream 25 and flue gas stream 20. A typical oxygen concentration for the primary oxidant stream 25 before additional oxygen is added is around 2.5% and the flue gas stream 20 usually has an oxygen concentration of about 2.5%.

Figure 8A:
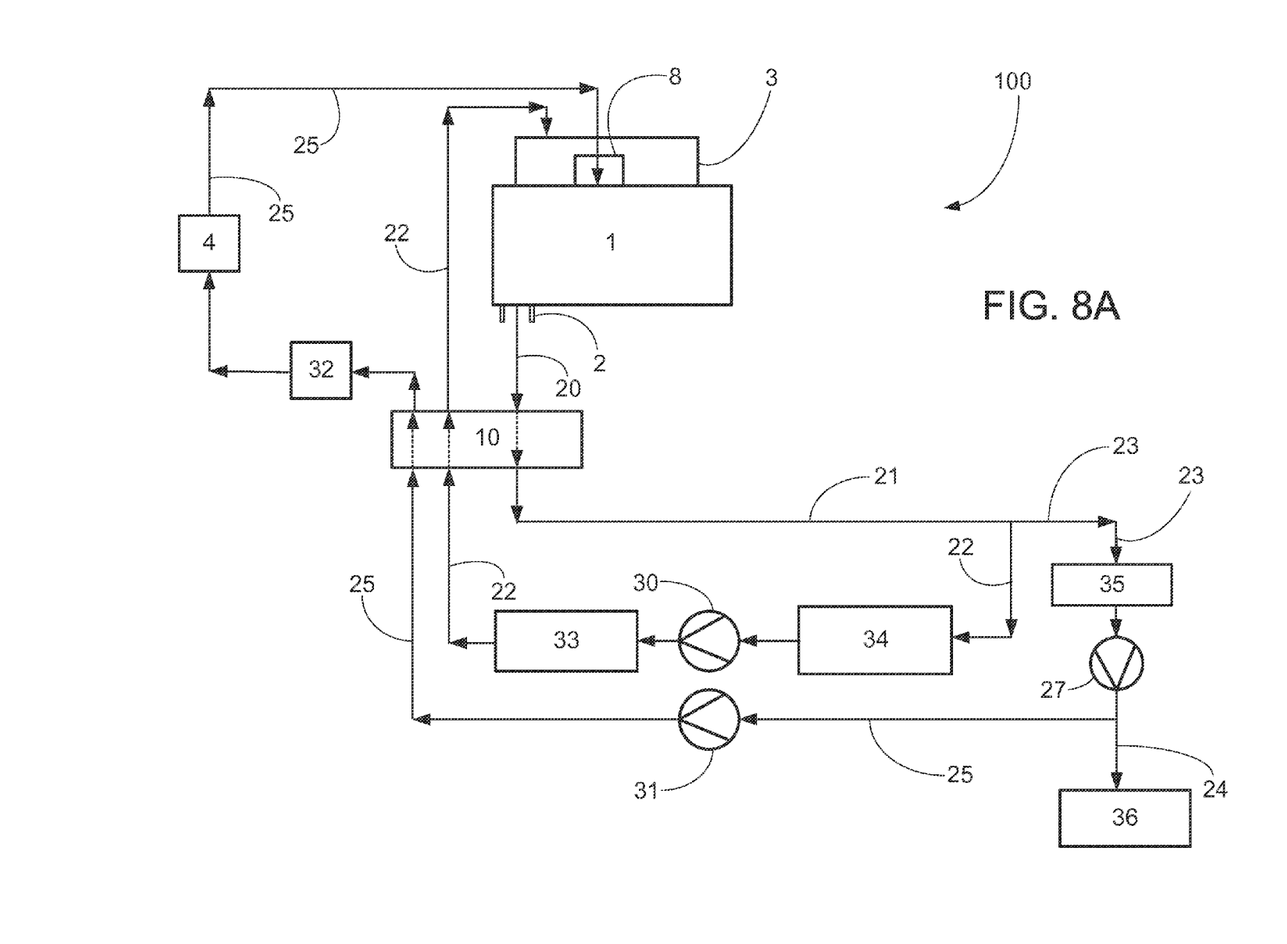
FIG. 8A is a schematic illustration of a system configuration for warm recycle oxy-fuel combustion according to the present invention showing, among other aspects, the respective positions of the oxidant heater, primary oxidant fan and primary oxidant mixer.

FIG. 8A is a schematic view of a warm recycle system 100 embodiment according to the present invention employing an oxidant heater 10 of the above described novel internal sector arrangement. Additionally, the inventive system 100 incorporates, among other elements, a primary oxidant fan 31, for feeding primary oxidant flow to the oxidant heater 10, located before (or upstream from) the oxidant heater 10. It also comprise a primary oxidant mixer 32 for injecting oxidant into the primary oxidant stream 25, located after (or downstream from) the oxidant heater 10. The oxidant which is added to the primary stream 25 by the primary oxidant mixer 32 is preferably pure or nearly pure oxygen. However, other oxidants such as for example atmospheric air or a mixture of flue gas and oxygen can also be used.

As can be seen in FIG. 5, the static gas pressure differential between the primary and secondary oxidant streams 25, 22 flowing through the primary and secondary combustion oxidant sectors 14, 13 is about +25 in wg. Therefore, the internal oxidant heater leakage will be from un-oxygenated primary stream 25 into the oxygenated secondary stream 22, as indicated by arrow 15b. Also, the pressure difference between the primary stream 25 and the flue gas stream 20 which respectively flow through the primary sectors 14 and the flue gas side 11 of the oxidant heater 10 is high (i.e., between +45 to +50 in. wg) which results in relatively high amount of leakage from the un-oxygenated primary stream 25 to the un-oxygenated flue gas stream 20 as indicated by arrows 15a. Thus, because the primary stream 25 has very low oxygen content, roughly equal to that of the flue gas stream 20, and because essentially all leakage will be from the primary stream 25 to both the flue gas stream 20 and the secondary combustion oxidant stream 22, essentially no oxygen is lost from stream 22.

Accordingly, use of the inventive oxidant heater internal arrangement in a system which places the primary oxidant mixer 32 downstream, ensures that no costly oxygen is lost because leakage to the flue gas side 11 and into the flue gas stream 20 will only be from the high pressure and low oxidant concentration primary stream 25.

Thus, a preferred method of the present invention includes the steps of providing an oxidant heater 10 with the above described internal sector arrangement; providing a primary oxidant fan 31 upstream from the oxidant heater 10 for feeding the primary oxidant stream 25 flow to the oxidant heater 10; splitting the cold primary combustion oxidant stream 25 before it enters the oxidant heater 10 on its way to the boiler 1; and directing the split primary combustion oxidant stream 25 to flow through the two separate primary combustion oxidant sectors 14;

A preferred method of the present invention also includes the steps of allowing cold primary oxidant from the primary combustion oxidant stream 25 flowing through the two primary combustion oxidant sectors 14 to leak into both the flue gas side 11 and into the secondary combustion oxidant sector 13; and then introducing oxidant into the primary combustion oxidant stream 25 downstream from the oxidant heater 10.

Furthermore, since the flow of the primary combustion oxidant stream 25 is less than the flow of the secondary combustion oxidant stream 22 and because the amount of oxygen in the primary stream 25 is much less, injecting the cooler oxygen into the primary stream 25 downstream from the oxidant heater 10 has the least impact on the oxidant heater 10 balance (loss of cooling and flow to absorb heat) and, if the oxygen is preheated before mixing with the primary oxygen stream 25 it reduces its impact on achieving the required primary oxygen temperature at the pulverizer for coal drying.

Accordingly, the method of the present invention may include the step of pre-heating the oxidant before it is introduced into the primary combustion oxidant stream 25.

The primary oxidant fan 31 provides volumetric flow to the primary oxidant stream 25 so that it flows through the oxidant heater 10. Therefore, due to the large amount of internal leakage from the primary combustion oxidant stream 25 to the flue gas stream 20, the flow of primary oxidant flowing out of the oxidant heater 10 toward the boiler 1 is reduced. Thus, the output of the primary fan 31 must be increased to maintain primary flow to the pulverizer 4, compensating for the flow lost to internal leakage.

Accordingly, a preferred method of the present invention also includes the step of increasing the power to the primary oxidant fan 31 to provide an additional primary flow to the oxidant heater 10.

Referring now to the system 100 of the present invention illustrated in FIG. 8A, the flue gas stream 20 which exits the boiler 1 via the boiler gas exit 2 flows through the flue gas side 11 of the oxidant heater 10. After passing through the oxidant heater 10, a portion 21 of the flue gas stream 20 which exits the oxidant heater 10 splits to form the secondary oxidant stream 22 as well as an intermediate flue gas stream 23.

Downstream from the point at which the portion 21 of the flue gas stream 20 splits is provided a particulate removal unit 34 for removing particulate matter, such as ash, from the secondary combustion oxidant stream 22. Just downstream from the particulate removal unit 34, the system of the present invention comprises a secondary oxidant fan 30 for feeding secondary flow to the oxidant heater 10 which is positioned upstream from the oxidant heater 10.

Additionally, downstream of the secondary oxidant fan 30 and upstream from the oxidant heater 10 is provided a secondary oxidant mixer 33 for introducing oxidant into the secondary combustion oxidant stream 22. Just as with the primary oxidant mixer 32, the oxidant which is added to secondary oxidant stream 22 by the secondary oxidant mixer 33 is preferably pure or nearly pure oxygen. However, other oxidants such as atmospheric air and a mixture of flue gas and oxygen can also be used. In an alternative embodiment the secondary oxidant mixer 33 is placed upstream of the secondary oxidant fan 30.

In addition, the system of the present invention also comprises a gas quality control system (GQCS) unit 35 located along the intermediate flue gas stream 23. The GQCS may comprise particulate, sulfur, and moisture removal devices to treat the passing flow stream. After it passes through the GQCS unit 35, the intermediate flue gas stream 23 splits to form the primary combustion oxidant stream 25 as well as a compression and purification (CPU) stream 24 which leads to a compression and purification unit 36.

Finally, after passing through the oxidant heater 10, the primary combustion oxidant stream 25 flows to a coal pulverizer(s) mill 4, where it dries the coal and conveys it to the burners 8, subsequently entering the combustion process. Additionally, after the secondary combustion oxidant stream 22 passes through the oxidant heater 10, it flows to a windbox 3 attached to the boiler 1, before entering the burner 8 and exiting into combustion process.

Accordingly, a method of the present invention may comprise the additional steps of providing a secondary oxidant fan 30 for feeding secondary oxidant stream 22 flow to the oxidant heater 10 and positioning it upstream from the oxidant heater 10; providing a secondary oxidant mixer 33 at a location upstream from the oxidant heater 10 and downstream from the secondary oxidant fan 30 for the purpose of introducing oxidant into the secondary combustion oxidant stream 22.

Furthermore, the method of the present invention may include the further steps of splitting a portion 21 of the flue gas stream 20 which exits the oxidant heater 10 to form the secondary combustion oxidant stream 22 and an intermediate flue gas stream 23; providing a particulate removal unit 34 along the secondary combustion oxidant stream 22 at a position upstream of the secondary oxidant fan 30; providing an GQCS unit 35 on the intermediary flue gas stream 23; splitting the intermediate flue gas stream 23 after it passes through the GQCS unit 35 to form both the primary combustion oxidant stream 25 and the CPU stream 24 which leads to a compression and purification (CPU) unit 36.

Finally, the method of the present invention may also comprise the further steps of directing the secondary combustion oxidant stream 22 to the windbox 3, after it passes through the oxidant heater 10 and directing the primary combustion oxidant stream 25 to a coal pulverizer 4 after it passes through the oxidant heater 10 and oxygen mixer 32.

Use of the above described system 100 and method of the present invention provide several advantages over conventional prior art systems for warm recycle oxy-fuel combustion.

The system and method of the present invention not only prevents loss of oxygen from the process as described above, it also provides sufficient cool primary combustion oxidant from the primary combustion oxidant stream 25 to the oxidant heater 10 which along with the oxygenated secondary oxygen stream 22 allows an acceptable oxidant heater 10 exit gas temperature.

Additionally the present invention also may reduce total fan power required compared to other conventional systems. Referring to FIG. 8A, the primary combustion oxidant stream 25 flowing to the oxidant heater 10 is adjusted by the primary fan 31 to achieve the desired primary outlet flow to the coal pulverizer 4. As mentioned above, the primary inlet flow to the oxidant heater 10 will be higher than the outlet flow as a result of the internal leakage. The need to compensate for the volume of flow lost to leakage will require an increase in the power to the primary fan 31 to provide additional flow. In addition the flow though the ID fan 27 will be increased by the leakage within the oxidant heater 10.

However, since the secondary stream 22 will gain flow from the primary 25 due to leakage, the secondary combustion oxidant flow 22 into the oxidant heater 10 is reduced compared to the required outlet flow. This results in a reduced power requirement for the secondary oxidant (or forced draft) fan 30. Since the secondary fan 30 typically operates at about 350 F or higher (warm recycle embodiments) while the primary fan 31 and ID fan 27 typically operates at about 150 F or lower the primary stream 25 and intermediate stream 23 is much cooler than the secondary stream 22 hence the power increase for the ID fan 27 and primary fan 31 can be less than the power reduction in the warm secondary fan 30 resulting in a net power savings depending on the magnitude of internal leakages. (See Tables 1 and 2 and FIG. 9).

In warm recycle embodiments, some of the higher primary flow will also leak to the exit gas side which will result in an increased flow to the scrubbers and moisture removal equipment resulting in a reduction in total sulfur and moisture returned to the boiler 1 via primary recycle stream 14. The final flow to the CPU unit 36 will be unchanged in magnitude and composition.

Furthermore, use of the system and method of the present invention also reduces sulfur and moisture in the boiler 1. As a result of the substantial internal oxidant heater 10 leakage(s), the flow in the intermediate flue gas stream 23 which splits to form the primary stream 25 and the CPU stream 24 is increased. In the warm recycle process, the secondary combustion oxidant stream 22 passes through particulate removal, the secondary fan 30, and is then routed directly back to the oxidant heater 10 and from the oxidant heater 10 to a windbox 3 attached to the boiler 1 with no sulfur or moisture removal. However, the intermediate flue gas stream 23, passes through particulate, sulfur and moisture removal in the GQCS unit 35. As a result, more flow passes through the GQCS unit 35 than would otherwise.

Since the primary flow in the primary oxidant stream 25 to the oxidant heater is increased in order to compensate for leakage, and because sulfur and moisture have been removed from that flow, the total amount of sulfur and moisture that returns to the boiler 1 is reduced as is the sulfur and moisture in the gas leaving the oxidant heater 10 by virtue of the internal leakage from the primary stream 25. In other words, since more gas is treated to remove sulfur and moisture, and since the flow to the CPU unit 36 is unchanged, the total moisture and sulfur in the recycle oxidant streams 22, 25 are lower, resulting in lower concentrations in the boiler 1.

Furthermore, if the oxidant heater 10 is sized so that conversion to full air firing does not change the oxidant heater 10 shell but may require routine changes to baffling and baskets (generally for the first application only), this design of the present invention could be converted to full air firing with a relatively simple and inexpensive internal change if necessary.

Because the system and method of the present invention allow the use of a regenerative oxidant heater it reduces a plants capital cost because regenerative oxidant heaters are less costly than separate tubular oxidant heaters and require considerably less space. Additionally, because its use substantially reduces the loss of costly oxygen and in many applications reduces the total fan power requirement, the system and method of the present invention enables plant operating cost reductions.

Figure 9:
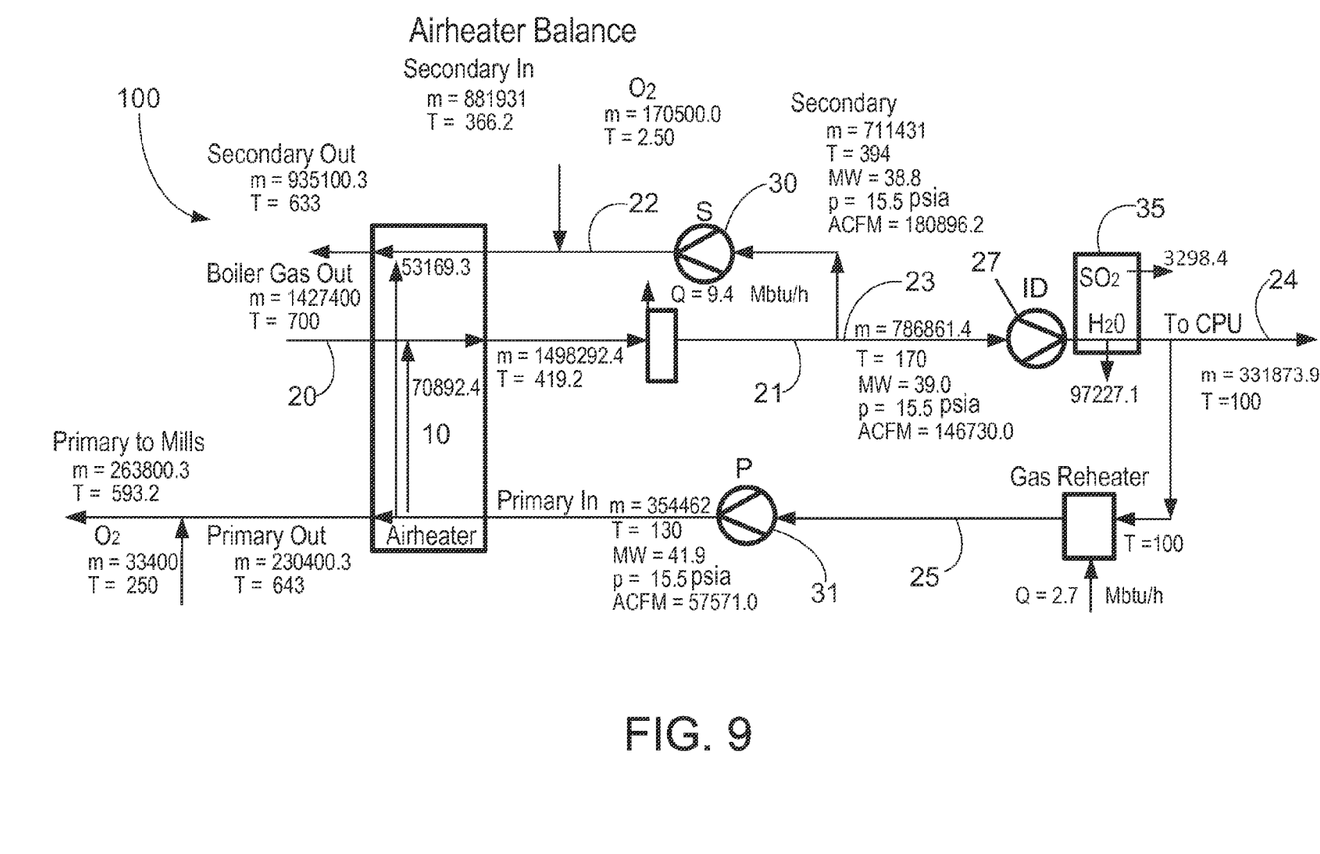
FIG. 9 is a schematic view of a system configuration for warm-recycle oxy-fuel combustion according to the present invention.

Tables 1 and 2 below show approximate estimates for oxygen and fan power used when employing the present invention as compared with separate primary and secondary oxidant heaters. Additionally, FIG. 9 shows oxidant heater balance in a system for warm recycle oxy-fuel combustion which employs the present invention as compared with what it would be if separate primary and secondary oxidant heaters were used.

Figure 10:
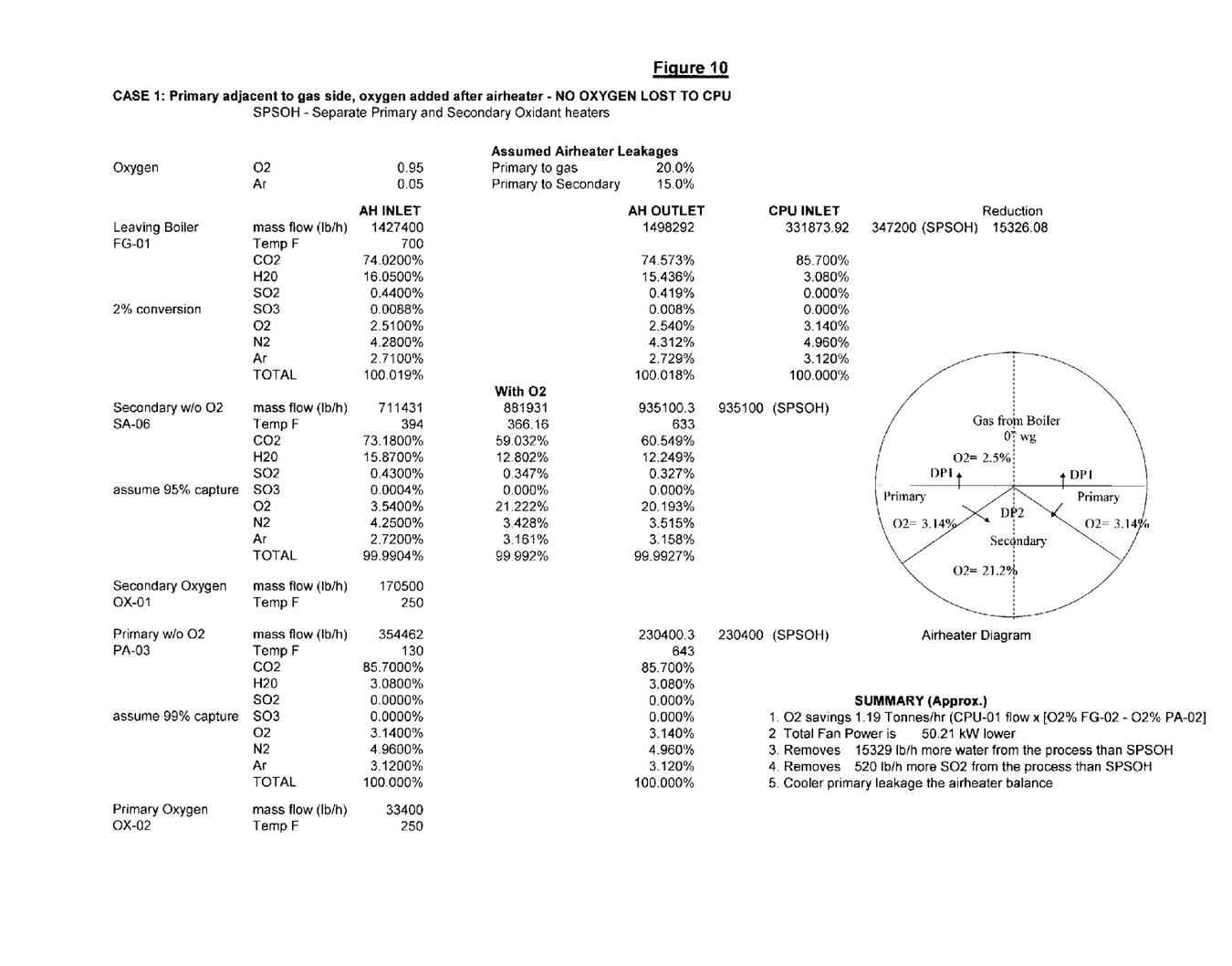
FIG. 10 is a table diagram of data relating to an embodiment of the present invention.
Figure 11:
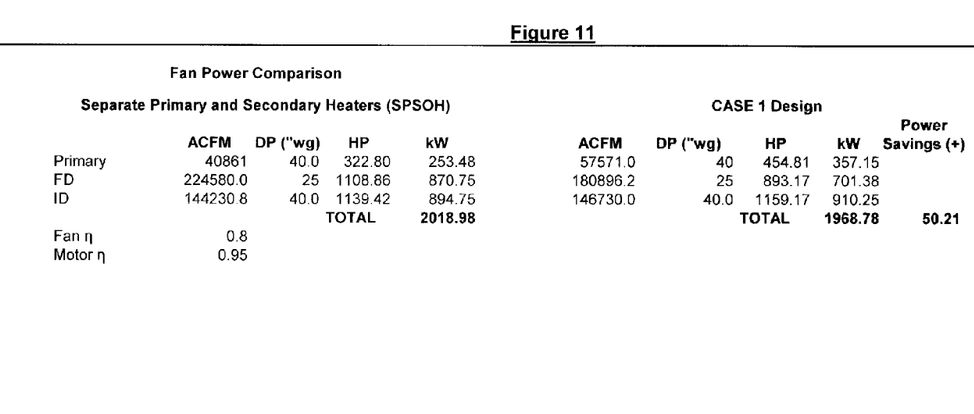
FIG. 11 is a table diagram of data relating to an embodiment of the present invention.

The calculations in FIGS. 10 and 11 as well as those in FIG. 7 are based on the assumption that the internal leakage from the primary oxidant stream 25 to the flue gas stream 20 and the secondary oxidant stream 22 is 20.0% and 15.0% respectively. The assumed leakage is what would be expected when the pressure of the primary oxidant stream 25 is +45 in. wg, when the pressure of the secondary oxidant stream 22 is +25 in. wg and when the pressure of the flue gas stream 20 is 0 in. wg.

As illustrated in table 1, table 2 and FIG. 7, use of the present invention leads to the following advantages over separate primary and secondary oxidant heaters. In one aspect, the present invention allows use of a single regenerative oxidant heater. Also, the amount of costly oxygen saved would be about 1.19 metric tons per hour. Additionally, when using the present invention, there is a reduction in total fan power required of about 50.2 Kilowatts of energy. Furthermore, the total sulfur and moisture contents in the primary and secondary recycle streams to the boiler were noticeably lower. As a result, use of the present invention significantly reduces plant capital cost as well as plant operating cost as compared with use of a conventional system.

Figure 8B:
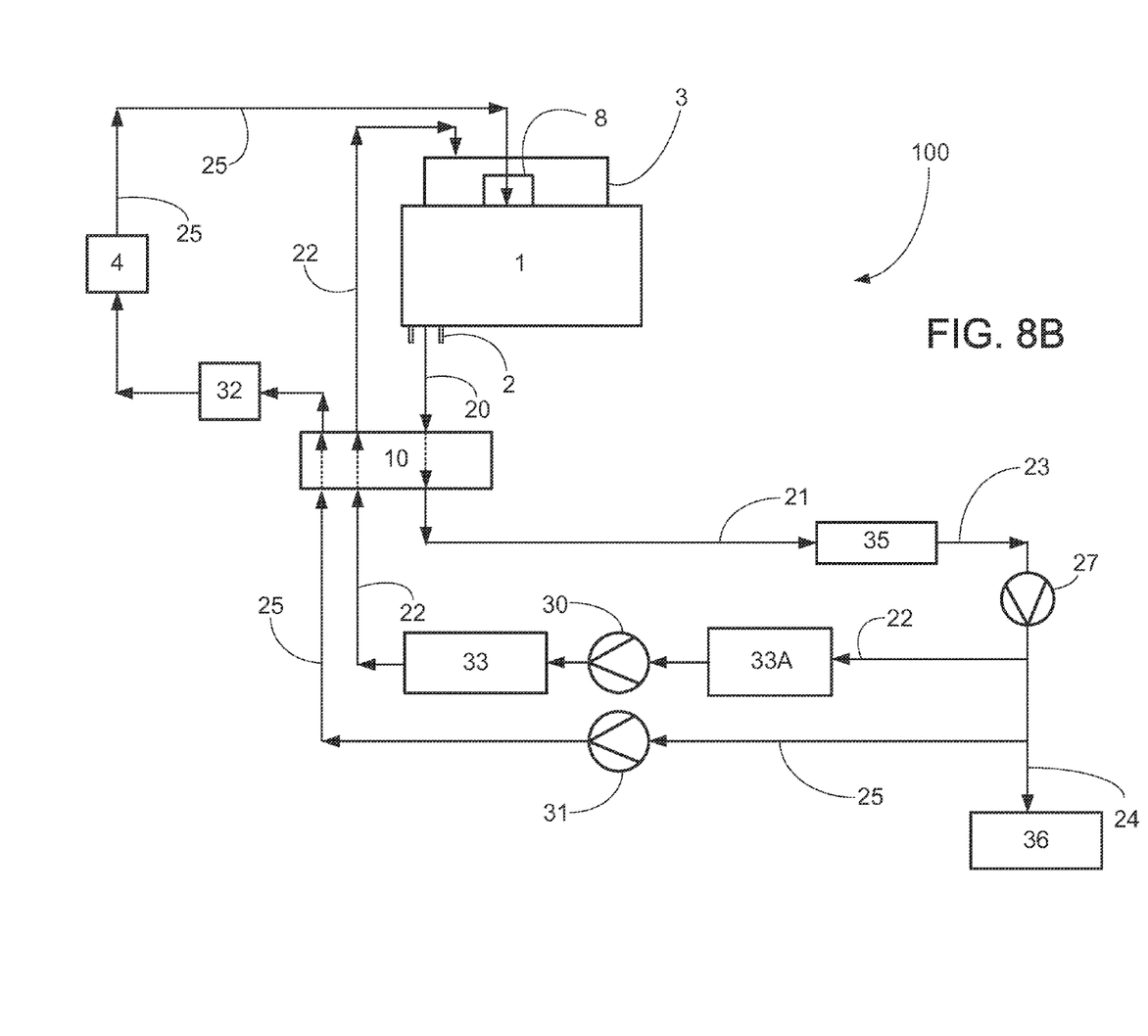
FIG. 8B is a schematic illustration of a system configuration for cold recycle oxy-fuel combustion according to the present invention showing, among other aspects, the respective positions of the oxidant heater, primary oxidant fan and primary oxidant mixer.

Referring now to FIG. 8B, a schematic illustration of an alternative system configuration embodiment, known as cold recycle is shown. In this embodiment flue gas stream 21 is split after the GQCS, thereby subjecting all recycled flow to GQCS treatment prior to being split into primary 23 and secondary 25 streams. An alternative location for secondary oxidant mixer 33A is also shown.

While specific embodiments of the invention have been shown and described in detail to illustrate the application of the principles of the invention, it will be understood that the invention may be embodied otherwise without departing from such principles.

I claim:

1. An oxidant heater internal sector arrangement comprising:
   a flue gas side consisting of a sector, through which a flue gas stream having a gas pressure, flows away from a boiler having a gas exit as said flue gas stream leaves said gas exit; and
   a counterflowing combustion oxidant side, said combustion oxidant side being comprised of:
   at least two secondary combustion oxidant sectors through which an oxygenated secondary combustion oxidant stream flows toward the boiler, said secondary combustion oxidant stream having a gas pressure; and
   at least three primary combustion oxidant sectors through which a pressurized cold primary combustion oxidant stream flows toward the boiler, said primary combustion oxidant stream having a gas pressure greater than that of said secondary combustion oxidant stream and said flue gas stream;
   wherein two of said at least three primary combustion oxidant sectors are positioned adjacent to both the flue gas side and to respective ones of said at least two secondary combustion oxidant sectors; and
   wherein said at least two secondary combustion oxidant sectors are located between the two of said primary combustion oxidant sectors positioned adjacent the flue gas side.

2. An oxidant heater internal arrangement as claimed in claim 1, wherein said primary combustion oxidant stream has a gas pressure between +40 to +45 inches water gauge, said secondary combustion oxidant stream has a gas pressure between +20 to +25 inches water gauge and said flue gas stream has a gas pressure between 0 to −5 inches water gauge.

3. A system of recycle oxy-fuel combustion comprising:
   an oxidant heater for recycling waste heat from a boiler and cooling flue gas from said boiler, said oxidant heater having an internal arrangement as claimed in claim 1;
   a primary oxidant fan for feeding primary oxidant flow to said oxidant heater positioned upstream from said oxidant heater; and
   a primary oxidant mixer for introducing a oxygen into said primary combustion oxidant stream positioned downstream from said oxidant heater.

4. A system of recycle oxy-fuel combustion as claimed in claim 3, wherein said oxidant heater comprises two secondary combustion oxidant sectors.

5. A system of recycle oxy-fuel combustion as claimed in claim 3, wherein the oxygen introduced into said primary combustion oxidant stream is relatively pure oxygen.

6. A system of recycle oxy-fuel combustion as claimed in claim 5, wherein the oxygen is introduced into said primary combustion oxidant stream and before it is introduced, said oxygen is pre-heated.

7. A system of recycle oxy-fuel combustion as claimed in claim 3, wherein said primary combustion oxidant stream has a pressure of about +40 to +45 inches water gauge, said secondary combustion oxidant stream has a pressure of about +20 to +25 inches water gauge and said flue gas stream has a pressure of about 0 to −5 inches water gauge.

8. A system of recycle oxy-fuel combustion as claimed in claim 3, further comprising:
   a secondary oxidant fan for feeding secondary oxidant flow to said oxidant heater positioned upstream from said oxidant heater; and
   a secondary oxidant mixer for introducing an oxidant into said secondary combustion oxidant stream positioned upstream from said oxidant heater and downstream from said secondary oxidant fan.

9. A system of recycle oxy-fuel combustion as claimed in claim 8, wherein said secondary oxidant fan operates at a temperature of at least 300° F. and said primary oxidant fan operates at a temperature of 170° F. or lower.

10. A system of recycle oxy-fuel combustion as claimed in claim 9, wherein after passing through said oxidant heater said secondary combustion oxidant stream flows to a windbox which is connected to said boiler, and wherein after passing through said oxidant heater, said primary combustion oxidant stream flows to a coal pulverizer.

11. A system of recycle oxy-fuel combustion as claimed in claim 10, further comprising:
   a particulate removal unit for removing particulate matter from said secondary combustion oxidant stream position upstream from said secondary oxidant fan;
   a gas quality control system located on an intermediate flue gas stream; and
   a portion of said flue gas stream which exits said oxidant heater, wherein said portion is divided and forms said secondary combustion oxidant stream as well as said intermediate flue gas stream,
   wherein after passing through said gas quality control system, said intermediate flue gas stream is divided and forms said primary combustion oxidant stream, and a exit stream which leads to a compression and purification unit.

12. A system of recycle oxy-fuel combustion as claimed in claim 3, comprising 3 primary combustion oxidant sectors.

* * * * *